L. S. CONNOR.
COMBINED CULTIVATOR AND FERTILIZER DISTRIBUTER.
APPLICATION FILED MAY 2, 1914.
1,260,332.
Patented Mar. 26, 1918.
2 SHEETS—SHEET 1.
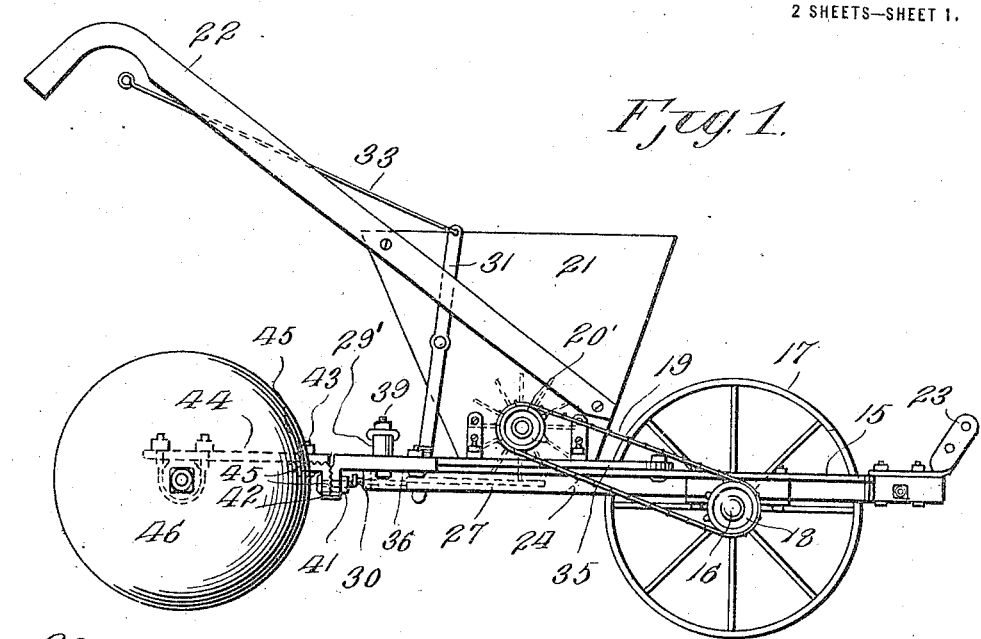
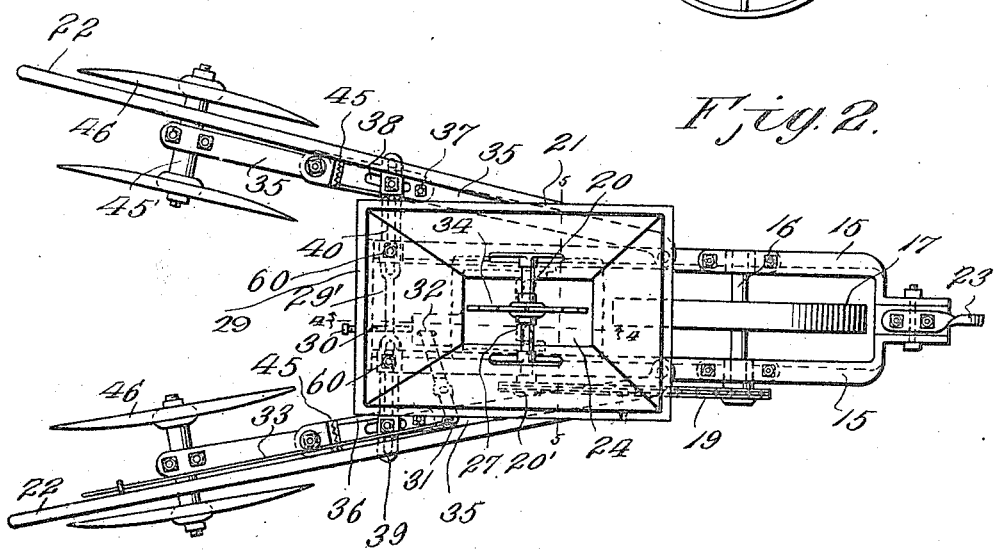

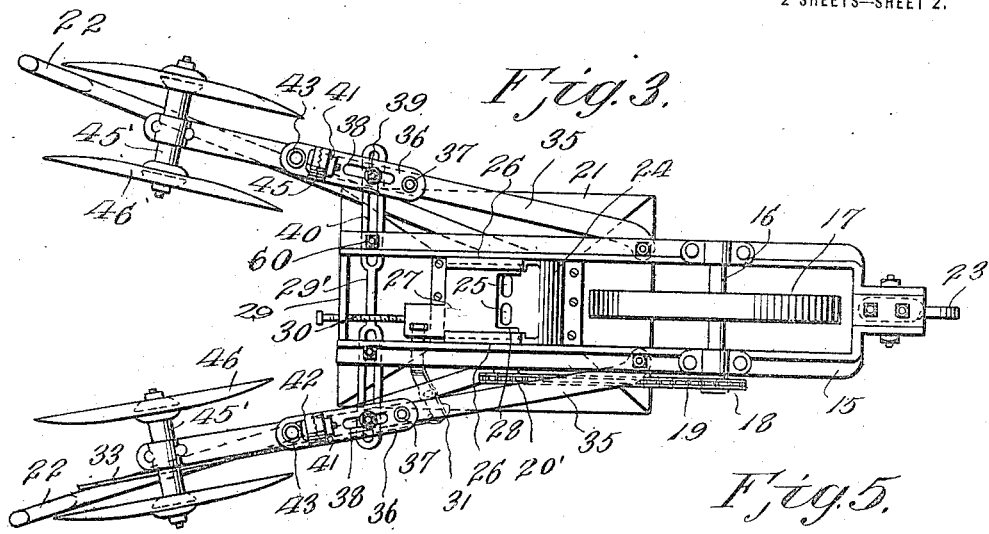
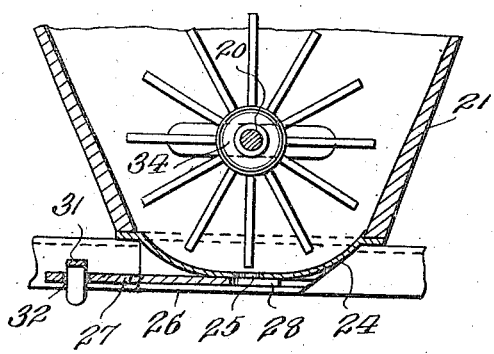
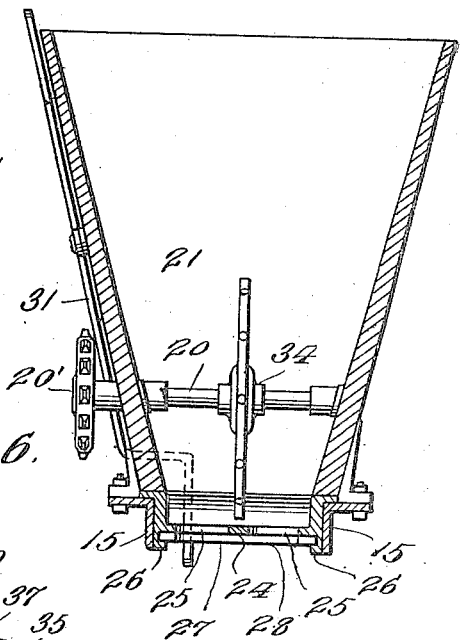
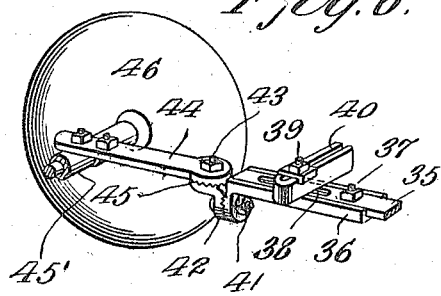

UNITED STATES PATENT OFFICE.

LAWRANCE S. CONNOR, OF BOWMAN, SOUTH CAROLINA.

COMBINED CULTIVATOR AND FERTILIZER-DISTRIBUTER.

1,260,332.  Specification of Letters Patent.  Patented Mar. 26, 1918.

Application filed May 2, 1914. Serial No. 835,911.

*To all whom it may concern:*

Be it known that I, LAWRANCE S. CONNOR, a citizen of the United States, residing at Bowman, in the county of Orangeburg and State of South Carolina, have invented new and useful Improvements in Combined Cultivators and Fertilizer-Distributers, of which the following is a specification.

This invention relates to combined cultivators and fertilizer distributers, and it has for its object to produce an implement which at a single operation will serve to deposit fertilizing material and prepare a seed bed for the reception of seed.

A further object of the invention is to provide simple and efficient means for regulating and controlling the quantity of fertilizing material to be deposited.

A further object of the invention is to produce a machine of the class described embodying cultivator disks supported for rotation and means for so supporting said disks that they may be adjusted in various directions to the most advantageous position for the work in hand.

With these and other ends in view which will readily appear as the nature of the invention is better understood, the same consists in the improved construction and novel arrangement and combination of parts which will be hereinafter fully described and particularly pointed out in the claim.

In the accompanying drawings has been illustrated a simple and preferred form of the invention, it being, however, understood that no limitation is necessarily made to the precise structural details therein exhibited, but that changes, alterations and modifications within the scope of the claim may be resorted to when desired.

In the drawings,—

Figure 1 is a side elevation of a machine constructed in accordance with the invention.

Fig. 2 is a top plan view of the same.

Fig. 3 is a bottom plan view.

Fig. 4 is a longitudinal sectional detail view taken through the lower part of the hopper substantially on the line 4—4 in Fig. 2.

Fig. 5 is a transverse sectional detail view taken on the line 5—5 in Fig. 2.

Fig. 6 is a perspective detail view illustrating the manner of supporting the cultivator disks.

Corresponding parts in the several figures are denoted by like characters of reference.

The frame of the machine comprises side members 15 having bearings to support an axle 16 carrying the ground wheel 17 and a sprocket 18 from which motion is transmitted by a chain 19 to a sprocket wheel 20' on a shaft 20 journaled transversely in the hopper 21 which is supported on the frame in rear of the ground wheel. The hopper is equipped with handles 22 for guiding the machine. A bracket 23 to which draft may be attached is supported at the forward end of the frame. A furrow opener may also be connected with the forward end of the frame, but such an arrangement being well known, it has not been illustrated.

The bottom of the hopper 21 consists of a plate 24 having openings 25 for the escape of the fertilizing material that is to be deposited. The bottom plate 24 has guide flanges 26 for a slide 27 which is provided with a single transverse slot or opening 28. By moving the slide 27 longitudinally, it is obvious that the effective area of the escape apertures 25 may be varied, or said apertures may be obstructed altogether, thereby regulating or suspending the deposit of fertilizing material. The frame of the machine includes a rear cross bar 29 having a set screw 30 located in the path of the slide 27 to obstruct the rearward movement thereof, and thereby preventing the opening of the discharge apertures beyond a certain predetermined limit, while not interfering with the movement of the slide to an obstructing position. The slide is operated by means of a lever 31 fulcrumed on the side of the hopper and having a downwardly extending arm engaging an aperture 32 in the slide. The upwardly extending arm of the lever 31 is connected with a push rod 33 whereby it may be conveniently actuated.

The shaft 20 carries within the hopper an agitator consisting of a hub 34 having a plurality of radial fingers which when the machine is in operation will serve to agitate and loosen the contents so that it will seek the exit apertures 25.

Supported pivotally on each side member 15 of the frame is a rearwardly extending arm 35 with which a channeled bracket member 36 is connected by a pin or bolt 37, said arm and bracket having registering slots 38 for the passage of a bolt 39 which also engages a slot 40 in an auxiliary cross bar 29' which is supported adjustably at the rear end of the frame by means such as bolts 60 that may engage the slots 40 in said auxiliary cross bar. The bracket 36 is of angular or L-shaped structure, its rearward end being downturned and connected pivotally by a bolt 41 with an angular swivel member 42 which in turn is connected by a bolt 43 with a supporting arm 44. The meeting faces of the angular swivel member 42 and the bracket 36 and arm 44 are circular in shape and are provided with interengaging radial corrugations, as shown at 45, concentric with the bolts or pivot members so that by tightening the nuts on the latter, the parts will be retained very securely in various adjusted positions. The arm 44 is provided with bearings to support a shaft 45′ with which the cultivator disks 46 are connected.

It will be seen from the foregoing description that by proper adjustment and manipulation of the parts, the cultivator disks at each side of the machine may be moved and adjusted in various directions, enabling the disks at the two sides of the machine to be spaced variously apart, permitting the disks to be placed at various angles with respect to the movement of the machine, and also providing for the tilting of said disks to various angles. It will be noted that the cross bar 29′ with which the disk supporting arms are connected may be adjusted laterally of the machine so as to vary the position of the disks with respect to the sides of the machine, without interfering with the operation of the set screw 30 which lies in the path of the slide or valve that regulates the deposit of fertilizing material. The deposit of said fertilizing material may be regulated or suspended, as may be desired, and said fertilizing material may be covered or partly covered by the action of the cultivating disks, thereby preparing a seed bed of any desired appropriate width.

Again, it will be seen that owing to the construction and arrangement of parts, as herein described, the device is capable of being successfully and usefully employed as a cultivator irrespective of the mechanism provided for distributing fertilizing material. This feature materially enhances the value of the machine for general agricultural purposes.

Having thus described the invention, what is claimed as new is:—

In a machine of the class described, a carrying frame having a main rear cross bar and an auxiliary rear cross bar located in different horizontal planes, the auxiliary cross bar being transversely adjustable with respect to the frame, a hopper mounted on the frame and having an apertured bottom member, a slide valve to regulate the escape of material through the bottom member, means for moving the valve, an adjustable stop member carried by the main cross bar and lying in the path of the slide valve to limit the movement thereof in one direction and covering means connected with the transversely adjustable cross bar.

In testimony whereof I affix my signature in presence of two witnesses.

LAWRANCE S. CONNOR.

Witnesses:
Wm. Bagger,
Bennett S. Jones.

Copies of this patent may be obtained for five cents each, by addressing the "Commissioner of Patents, Washington, D. C."